United States Patent [19]

Kuhn

[11] 4,091,034

[45] May 23, 1978

[54] LIQUID, WATER-INSOLUBLE POLYMERIC TRIPHENYLMETHANE COLORANTS AND AQUEOUS DISPERSIONS CONTAINING SAME

[75] Inventor: Hans Heinrich Kuhn, Spartanburg, S.C.

[73] Assignee: Milliken Research Corporation, Spartanburg, S.C.

[21] Appl. No.: 728,522

[22] Filed: Oct. 1, 1976

[51] Int. Cl.² .................. C09B 11/12; C09B 11/14
[52] U.S. Cl. .................. 260/391; 260/207.5; 260/379; 260/386; 260/389; 260/393; 260/573
[58] Field of Search .................. 260/208, 207.5, 369, 260/386, 389, 390, 391, 393; 8/164

[56] References Cited

U.S. PATENT DOCUMENTS

| 3,157,633 | 11/1964 | Kuhn | 260/200 |
|---|---|---|---|
| 3,337,525 | 8/1967 | Peters et al. | 260/200 |
| 3,449,319 | 6/1969 | Kuhn | 260/207.5 |

FOREIGN PATENT DOCUMENTS

| 40-9556 | 5/1965 | Japan | 260/207.5 |
|---|---|---|---|
| 46-23793 | 7/1971 | Japan | 260/207.5 |

*Primary Examiner*—Floyd D. Higel
*Attorney, Agent, or Firm*—H. William Petry; Glen M. Burdick

[57] ABSTRACT

Liquid, water-insoluble colorants and aqueous dispersions of same are provided in which the colorant is represented by the formula R - (oleophilic polymeric constituent)$_n$, wherein R is an organic dyestuff radical, the oleophilic polymeric constituent is polyalkylene oxides and copolymers of polyalkylene oxides in which the alkylene moiety of the polymeric constituent contains at least 3 carbon atoms and such polymeric constituent has a molecular weight of at least 500, and $n$ is an integer of from 1 to 6.

5 Claims, No Drawings

LIQUID, WATER-INSOLUBLE POLYMERIC TRIPHENYLMETHANE COLORANTS AND AQUEOUS DISPERSIONS CONTAINING SAME

This invention relates to colorants for textile materials. In one aspect the invention relates to liquid colorants. In another aspect it relates to water-insoluble liquid colorants for imparting hues to white textile materials.

Colorants, e.g., tints, have been employed to impart colors to textile fabrics and fibers. The use of small amounts of certain tints have been employed as "bluing agents" to provide white fabrics with a bluish hue. Such bluing agents are added during the laundry cycle. In the United States, a bluish-white is desired as it appears whiter than a yellowish-white which is associated with a solid condition. In other parts of the world, different colored tints are employed to achieve the same effect. For example, many Europeans prefer for the white fabric to have a greenish-blue hue whereas the orientals prefer a pink or rosy hue for white fabrics.

Heretofore, the colorants employed to produce the desired hues on white fabrics have generally been finely divided insoluble substances. These finely divided solid colorants have been used successfully on fabrics produced from natural fibers, such as cotton wherein the fibers have highly irregular surfaces. However, such solid pigments do not impart the desired hue to fabrics made of synthetic fibers, such as polyester, polyamide, rayon and the like, since the solid colorants are not retained on the smooth surfaces of such synthetic fibers. Thus, new and improved colorants for imparting hues to fabrics of synthetic fibers have long been sought.

An object of the present invention is to provide colorants for imparting hues to textile materials.

Another object of the invention is to provide improved colorants for imparting hues to textile materials produced from synthetic fibers.

These and other objects of the invention will be apparent to those skilled in the art from a reading of the following detailed description.

The colorants of the present invention for imparting hues to white textile fabrics produced from synthetic fibers are liquid, water-insoluble colorants at ambient conditions. Such liquid colorants comprise an organic dyestuff radical and at least one oleophilic polymeric constituent. Such colorants are represented by the formula R - (oleophilic polymeric constituent)$_n$ wherein R is an organic dyestuff radical and $n$ is an integer of 1 to 6.

The organic dyestuff radical of the liquid colorants of the invention can vary widely, such depending to a large extent upon the desired color of the colorant. Preferably, the organic dyestuff radical is attached to the oleophilic polymeric constituent through an amino nitrogen. Dyestuff radicals contemplated within the preferred class are nitroso, nitro, azo, including monoazo, diazo and triazo, diarylmethane, triarylmethane, xanthene, acridene, methine, thiazole, indamine, azine, oxazine, or anthraquinone dyestuff radicals. Particularly useful in the preparation of the liquid colorants of the invention are the azo, anthraquinone and triarylmethane dyestuff radicals.

The oleophilic polymeric constituent of the colorants of the invention can be any suitable liquid oleophilic polymeric constituent which renders the resulting colorant liquid and water-insoluble. Typical of such liquid oleophilic polymeric constituents which can be attached to the dyestuff radical are the polymeric epoxides, such as the polyalkylene oxides and copolymers thereof having an average molecular weight of at least about 500. Since it is essential that the polymeric constituent be liquid, and thus the resulting colorant also be liquid, the polyalkylene oxides and copolymers thereof are those in which the alkylene moiety contains a majority of at least 3 carbon atoms. Typical of polyalkylene oxides and copolymers of same which are liquid and can be employed to provide the liquid, water-insoluble colorant of the present invention are polypropylene oxides, polybutylene oxides, copolymers of polypropylene oxides and polybutylene oxides, and other copolymers including block copolymers, in which a majority of the polymeric constituent, e.g., the oleophilic constituent, is polypropylene oxide and/or polybutylene oxide. Further, such oleophilic polymeric constituents will have an average molecular weight in the range of from about 500 to about 100,000, preferably from about 2,000 to about 20,000.

Any suitable procedure may be employed to produce the liquid colorants of the invention whereby the oleophilic polymeric constituent or constituents are coupled to an organic dyestuff radical. For example, the procedures set forth in U.S. Pat. No. 3,157,633, hereby incorporated by reference, may be employed. Further, it may be necessary to use an organic solvent as the reaction medium since the water-insoluble oleophilic polymeric constituent is preferably in solution when coupled to the organic dyestuff radical. Any suitable organic solution can be employed. The particular shade of the colorant will depend primarily upon the particular dyestuff radical selected. A large variety of colors and shades may be obtained by blending two or more colorants. Blending of the liquid colorants of the present invention can readily be accomplished as the colorants are polymeric materials having substantially identical solubility characteristics, such being dictated by the nature of the polymeric chain. Therefore, the polymeric colorants are soluble in one another, and are completely compatible with each other.

For example, the liquid colorants of the invention may be prepared by converting a dyestuff intermediate containing a primary amino group into the corresponding oleophilic polymeric compound and employing the resulting compound to produce a compound having a chromophoric group in the molecule. In the case of azo dyestuffs, this may be accomplished by reacting a primary aromatic amine with an equimolar amount of an alkylene oxide, such as, propylene oxide, according to procedures well known in this art, and then coupling the resulting compound with a diazonium salt of an aromatic amine. In order to prepare liquid colorants of the triarylmethane class, aromatic amines that have been reacted as stated above with an alkylene oxide are condensed with aromatic aldehydes and the resulting condensation products oxidized to form the triarylmethane liquid colorants. While azo, triphenylmethane and anthraquinone liquid colorants are preferred because of their ease of preparation and brilliance of color as well as the multitude of shades available, many other liquid colorants can be prepared by known procedures using N,N-disubstituted tertiary amines as starting materials.

The liquid colorants of the present invention may be applied to textile materials by any convenient means. For example, the colorants may be combined with a detergent, with softeners, or used separately in the final rinse water. Further, the liquid colorants can be used in a concentrated form or as an aqueous dispersion. Aqueous dispersions are particularly important because of their ease of preparation and the extremely fine particle size of the liquid colorant in the aqueous medium, a feature not obtainable with solid colorants of the prior art. When employed as an aqueous dispersion, the colorants will generally be present in an amount of from about 0.01 to 50 weight percent of the aqueous dispersion. Especially desirable results can be obtained when the amount of colorant present in the dispersion is from about 1 to 5 weight percent.

In order to further illustrate the preparation and use of the liquid colorants for imparting hues to white, synthetic textile materials, the following preparations and examples are set forth. It is to be understood that such preparations and examples are for illustrative purposes and are not to be construed as unduly limiting the scope of the present invention.

PREPARATION I 93.0 grams (1 mole) of aniline was placed in a flask equipped with a stirrer, thermometer, an addition flask and a reflux condenser. The aniline was heated to about 140° C and thereafter propylene oxide was added into the vigorously stirred aniline, dropwise, while maintaining the temperature in the range of about 150° to 170° C. The amount of propylene oxide added was that amount required to form a reaction product containing about 2 moles of propylene oxide. An adequate portion of the dihydroxy propyl aniline (1/10 mole) was then placed in another flask which was also equipped with a stirrer, thermometer, addition flask and a reflux condenser. About 0.5 weight percent, based on the total weight of the desired end product, of potassium hydroxide was added to the reaction flask containing the dihydroxy propyl aniline and the reactants were heated to a temperature of about 170° C. Propylene oxide was then added to the vigorously stirred molten material, while maintaining the temperature of such material at about 170° C, until a total of about 50 propylene oxide units had been added and a product was formed, a propoxylated aniline, having a molecular weight of about 3,000. The compound so produced is represented by the general formula

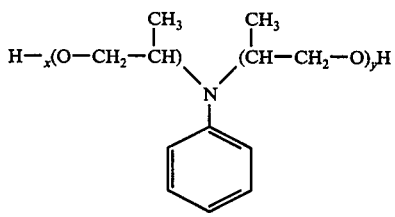

including isomers and wherein the sum of x and y is about 50.

The procedure of Preparation I was repeated, employing amounts of propylene oxide to produce compounds having the above formula wherein the total of x and y is about 6, and about 44.

PREPARATION II 18.1 grams (0.1 mole) of N,N-dihydroxyethyl m-toluidine was placed in a flash equipped with a stirrer, thermometer, an addition flask and a reflux condenser. The material was heated to a temperature of about 150° - 170° C and thereafter butylene oxide was added into the vigorously stirred molten material, dropwise, until a sufficient amount of butlyene oxide had been added to form an intermediate product containing about 2 moles of butylene oxide. An amount of potassium hydroxide, e.g., about 0.5 weight percent based on the total weight of the end product, was added to the reaction product and butylene oxide was again added to the reaction mixture which was maintained at a temperature of about 170° - 180° C until a total of about 12 moles of butylene oxide had been added, which resulted in a product having a molecular weight of about 957. The compound so produced is represented by the general formula

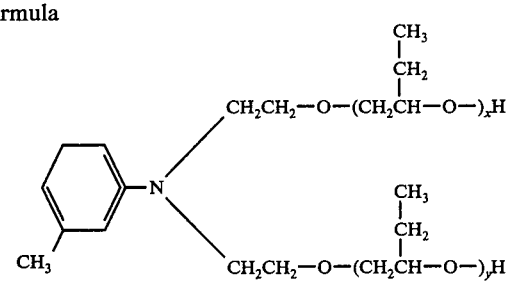

including isomers thereof and wherein the sum of x and y is about 12.

The product of Preparation II was repeated, employing an amount of butylene oxide to produce a compound having the above formula wherein the total of x and y is about 34 and the molecular weight of the product is about 2575.

EXAMPLE I 0.2 mole of the 20 molar propylene oxide derivative of polymeric aromatic amine composition prepared as set forth above in Preparation I was dissolved in methanol. The resulting mixture contained about 5 - 10 weight percent of the polymeric amine. 0.2 mole of diazotized aniline in dilute aqueous hydrochloric acid was then added to the admixture and the pH of the reaction mixture was maintained at a level of about 3.5 by the addition of sodium acetate. After all of the diazotized aniline had reacted, the reaction mixture was neutralized by the addition of sodium bicarbonate. A yellow, water-insoluble liquid colorant was formed, which after separation, was used as a colorant for a polyester fabric in a simulated rinse cycle. The colorant imparted the desired yellow hue to white polyester fabrics.

EXAMPLE II 0.05 mole of about a 34 molar butylene oxide derivative of the polymeric aromatic amine composition prepared as set forth in Preparation II was dissolved in 250 ml of a methanol solution. 0.05 mole of diazotized aniline was added to the methanol - amine solution, dropwise, as the solution was being agitated. After an equimolar amount of the diazotized aniline had been added as required to couple with the butylene oxide derivative an additional 100 ml of the methanol solution was added, followed by the addition of 100 ml of acetone. The pH of the resulting admixture was then adjusted to a pH level of from about 6 to 7 by the addition of sodium acetate. An equivalent volume of water, based on the total volume of the reaction mixture, was then added which caused the colorant to separate as a yellow, water-insoluble liquid. The colorant was then separated, tested as set forth in Example I, and the results of such tests was the imparting of a yellow hue to white polyester fabrics.

EXAMPLE III 0.2 mole of about a 34 molar butylene oxide derivative of the polymeric aromatic amine composition prepared as set forth in Preparation II was condensed with a mixture containing about 0.1 mole of N,N-dimethylaminoparabenzaldehyde, about 2 grams urea, and about 30 grams of 31% hydrochloric acid. The condensation of the polymeric amine composition was carried out at a temperature of about 120° C for a period of time of about 4 hours. After the condensation reaction was completed, the resulting condensation product was cooled to room temperature. The condensation product was then diluted with isopropanol and oxidized with finely divided lead dioxide. The oxidized product was neutralized with sodium bicarbonate, filtered and evaporated. A liquid brilliant neutral blue colorant was recovered. The liquid colorant was water insoluble and possessed very high color values. The liquid blue colorant, when employed as a bluing agent for polyester fabrics in a simulated rinse cycle imparted a bluish hue to white polyester fabrics which was evenly absorbed upon the surface of the fabric.

The above examples clearly set forth the formation of liquid colorants for imparting hues to textiles, especially textiles containing synthetic fibers. Such is possible because the liquid water-insoluble colorants of the invention can be deposited on the surface of textile materials in extremely uniform and thin layers. Such a control as to the uniformity and thickness of the layer of colorants have not heretofore been possible with solid pigments. Further, even when attempting to disperse solid pigments in liquids, problems have been encountered of adhering to certain fibers while having no adhesion whatsoever on other fibers, even in the same textile fabric.

While the above examples have been given to further illustrate the liquid water-insoluble colorants of the present invention, it is to be understood that many additional liquid colorants could be produced, having varying colors and shades, by modifying the dyestuff radical. Such variations and modifications are within the scope of the present invention.

Having thus described the invention, we claim:

1. A liquid, water-insoluble blue colorant having the formula R-(oleophilic polymeric constituent)$_n$ wherein R is a triphenylmethane dyestuff radical, the oleophilic polymeric constituent is a polyalkylene oxide and co-polymers of polyalkylene oxides in which the alkylene moiety contains at least 3 carbon atoms, said polyalkylene oxide and co-polymer of polyalkylene oxides having a molecular weight of at least 500, and $n$ is an integer of from 1 to 6.

2. The liquid, water-insoluble blue colorant of claim 1 wherein said polyalkylene oxide and co-polymers thereof are selected from the group consisting of polypropylene oxide, polybutylene oxide, and co-polymers thereof having a molecular weight in the range of from 2000 to 20,000.

3. An aqueous dispersion for imparting a bluish hue to textiles consisting essentially of water and from 0.01 to 50 weight percent of a liquid, water-insoluble colorant having the general formula R-(oleophilic polymeric constituent)$_n$ wherein R is a triphenylmethane dyestuff radical, the oleophilic polymeric constituent is polyalkylene oxide and co-polymers of polyalkylene oxides in which the alkylene moiety contains at least 3 carbon atoms, said polyalkylene oxide and co-polymers of polyalkylene oxides having a molecular weight of at least 500, and $n$ is an integer of from 1 to 6.

4. The aqueous dispersion of claim 3 wherein said polyalkylene oxides and co-polymers thereof are selected from the group consisting of polypropylene, polybutylene, and co-polymers thereof having a molecular weight in the range of from 2,000 to 20,000.

5. The aqueous dispersion of claim 4 wherein said liquid, water-insoluble colorant is present in an amount of from 1 to 5 weight percent.

* * * * *

UNITED STATES PATENT OFFICE
CERTIFICATE OF CORRECTION

Patent No. 4,091,034　　　　Dated May 23, 1978

Inventor(s) Hans Heinrich Kuhn

It is certified that error appears in the above-identified patent and that said Letters Patent are hereby corrected as shown below:

Column 3, line 63, after the word "isomers", insert the word --thereof--.

Column 4, line 4, the word "flash" should be --flask--.

Column 4, lines 21-32, delete the structural formula which appears and insert therefor:

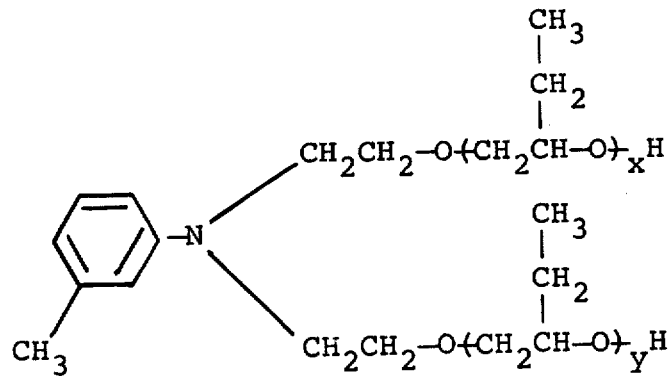

Signed and Sealed this

First Day of January 1980

[SEAL]

Attest:

SIDNEY A. DIAMOND

Attesting Officer　　Commissioner of Patents and Trademarks